United States Patent [19]
Schmitt

[11] Patent Number: 5,062,143
[45] Date of Patent: Oct. 29, 1991

[54] TRIGRAM-BASED METHOD OF LANGUAGE IDENTIFICATION

[75] Inventor: John C. Schmitt, Indialantic, Fla.

[73] Assignee: Harris Corporation, Melbourne, Fla.

[21] Appl. No.: 485,115

[22] Filed: Feb. 23, 1990

[51] Int. Cl.$^5$ .......................... G06K 9/62; G06K 9/72
[52] U.S. Cl. ........................................ 382/36; 382/39; 382/40
[58] Field of Search ................... 382/36, 40, 9, 37, 38, 382/39

[56] References Cited

U.S. PATENT DOCUMENTS

| | | | |
|---|---|---|---|
| 3,969,698 | 7/1976 | Bollinger et al. | 381/43 |
| 4,754,489 | 6/1988 | Bokser et al. | 382/40 |
| 4,829,580 | 5/1989 | Church | 381/52 |

Primary Examiner—Leo H. Boudreau
Assistant Examiner—Steven P. Fallon
Attorney, Agent, or Firm—Evenson, Wands, Edwards, Lenahan & McKeown

[57] ABSTRACT

A mechanism for examining a body of text and identifying its language compares successive trigrams into which the body of text is parsed with a library of sets of trigrams. For a respective language-specific key set of trigrams, if the ratio of the number of trigrams in the text, for which a match in the key set has been found, to the total number of trigrams in the text is at least equal to a prescribed value, then the text is identified as being possibly written in the language associated with that respective key set. Each respective trigram key set is associated with a respectively different language and contains those trigrams that have been predetermined to occur at a frequency that is at least equal to a prescribed frequency of occurrence of trigrams for that respective language. Successive key sets for other languages are processed as above, and the language for which the percentage of matches is greatest, and for which the percentage exceeded the prescribed value as above, is selected as the language in which the body of text is written.

6 Claims, 2 Drawing Sheets

THIS SENTENCE IS WRITTEN IN ENGLISH
THI
　HIS
　　IS_
　　S_S
　　　_SE
　　　　•
　　　　 •.
　　　　　•
　　　　　　　GLI
　　　　　　　 LIS
　　　　　　　　ISH

5,062,143

TRIGRAM-BASED METHOD OF LANGUAGE IDENTIFICATION

FIELD OF THE INVENTION

The present invention relates in general to character recognition systems and is particularly directed to a mechanism for identifying in what language a body of text has been written, based upon the contents of the trigrams into which the text may be parsed.

BACKGROUND OF THE INVENTION

Computer-based word processing applications, such as speech recognition, grammatical and spelling correction, textual searching, etc., typically employ some form of probabilistic character recognition system, unique to a particular language, to analyze a particular property of a body of text. For an illustration of such computer-based character recognition systems attention may be directed to the following U.S. Patents: Blum et al "Cryptographic Analysis System" U.S. Pat. No. 4,610,025; Balm "Method and Apparatus for Context-Aided Recognition" U.S. Pat. No. 4,058,795; Bokser "Means for Resolving Ambiguities in Text Based Upon Character Context" U.S. Pat. No. 4,754,498; and Baker et al "Speech Recognition Apparatus and Method" U.S. Pat. No. 4,783,803.

Language identification systems, namely, identifying the particular language of a given quantity of speech or text, on the other hand, have been based on an analysis of the characteristics of a speech signal waveform produced by the human voice (often converted into machine readable (digitized) format). Unfortunately, because many of the characteristics of a signal waveform that is representative of human speech is the same or very similar for different languages, the amount of information available to clearly demarcate one spoken language from another is extremely limited and is usually processed through the use of a histogram profile, thereby making the process a time-consuming exercise. For a discussion of phonetic speech processing, attention may be directed to an article entitled "A Phonetically-Based Speech Recognition System" by W. S. Meisel et al, in Speech Technology, Apr/May 1989, pp 44–48.

SUMMARY OF THE INVENTION

In accordance with the present invention, rather than focus upon selected characteristics of a speech signal waveform or phonetic analysis to estimate in the language of spoken word, there is provided a new and improved mechanism for examining a body of text and identifying its language by comparing successive strings of characters into which that body of text is parsed with a library of key sets, one for each language, of character subsets (trigrams). For a respective language, if the ratio of the number of trigrams of the examined body of text, matching trigrams in that language's key trigram set, to the total number of trigrams of the body of text is at least equal to a prescribed value, then the text is identified as being written in that language. Each respective key trigram set is associated with a respectively different language and contains those trigrams that have been predetermined to occur at a frequency that is at least equal to a prescribed frequency of occurrence of trigrams for that respective language. The prescribed frequency of occurrence is preferably established in accordance with a measured probability of occurrence of every trigram capable of occurring in that language.

Specifically, for each respective language, the key set of trigrams to be used in determining whether or not a body of text has been written in that language is generated by parsing a reasonably sized section of text of that language (e.g. on the order of 5,000 characters) into a plurality of trigrams and counting the number of occurrences of each parsed trigram. (For a 5,000 character set, there are 4,998 successive trigrams.) Then a determination is made of the ratio of each of the number of occurrences of the trigrams thus counted with the total number of trigrams into which the section of text has been parsed. From these ratios a characteristic is derived which is representative of the frequency of trigram occurrence of each trigram that may be formed using both the characters of that language and a space position. An examination of the characteristic will reveal which trigrams are associated with a selected frequency of occurrence or higher, such that the set of such key trigrams accounts for a selected proportion of the total set of trigrams parsed (e.g. 30%). Those trigrams whose frequency of occurrence is at least equal to the selected frequency of occurrence are used as the key set for that language. For a twenty six letter alphabet and space location it turns out that, in general, there are approximately 80 trigrams that occur at a frequency of occurrence representative of a high enough probability that the set of approximately 80 will account for approximately 30 percent of the trigrams of a given language, and thus a member of such a key set has a high probability of being associated with that specific language.

DETAILED DESCRIPTION

Figures 1, 2:
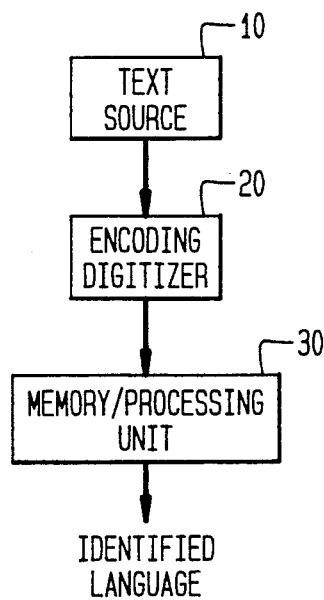
FIG. 1 is a functional block diagram of text processing system for language identification.
FIG. 2 is a diagrammatic illustration of the parsing of an exemplary string of text for language identification in accordance with the present invention.

Before describing in detail the particular improved language identification mechanism in accordance with the present invention, it should be observed that the present invention resides primarily in a novel text character string processing methodology using a conventional data processing system. Accordingly, the structure, control and arrangement of the components of such a system have been illustrated in the drawings by a readily understandable block diagram which shows only those details that are pertinent to the present invention, so as not to obscure the disclosure with structural details which will be readily apparent to those skilled in the art having the benefit of the description herein. Thus, the block diagram does not necessarily represent the mechanical structural arrangement of the exemplary system, but is primarily intended to illustrate the major structural components of the system in a convenient functional grouping, whereby the present invention may be more readily understood.

Referring now to FIG. 1, a functional block diagram of a text processing system for language identification in accordance with the present invention is diagrammatically illustrated as comprising a text source 10, such as an actual hard copy of a document that may be scanned by an optical character reader, encoded text stored on a word processing storage medium (e.g. floppy disk), etc. Through an associated interface unit (e.g. encoder/digitizer) 20, the text, which has been converted into digital format, is encoded for storage and analysis by memory/processor unit 30 that has been programmed to execute the language processing mechanism of the present invention to be described below. In addition to the following description of the details of the functionality executed by the inventive process, a source code listing of its application program, for a set of exemplary languages (i.e. English, German, Hebrew, Japanese, Hungarian, French, Turkish, Swahili and Russian), is contained in Appendix A.

As described briefly above, the processing methodology employed by the present invention uses a key set, the collection of key sets for all languages in the language constituting a library, of trigrams, each set being associated with a respectively different language. In the course of analyzing a body of text input from text source 10, processor unit 30 will sequentially access the respective language-specific key sets of trigrams and compare the trigrams into which the input body of text is parsed with the contents (approximately 80 trigrams) of each trigram key set in the library. If the percentage of parsed trigrams in the body of text for which copies are found in a respective key set is at least equal to a preselected value, based upon a previously conducted probability of occurrence determination, then the language of that key set is chosen as one possible language in which the body of text is written. After all language key sets in the library have been so processed, that language key set which resulted in the greatest number of matches from among those which qualified as possible, is chosen as the language in which the body of text is written.

Figure 3:
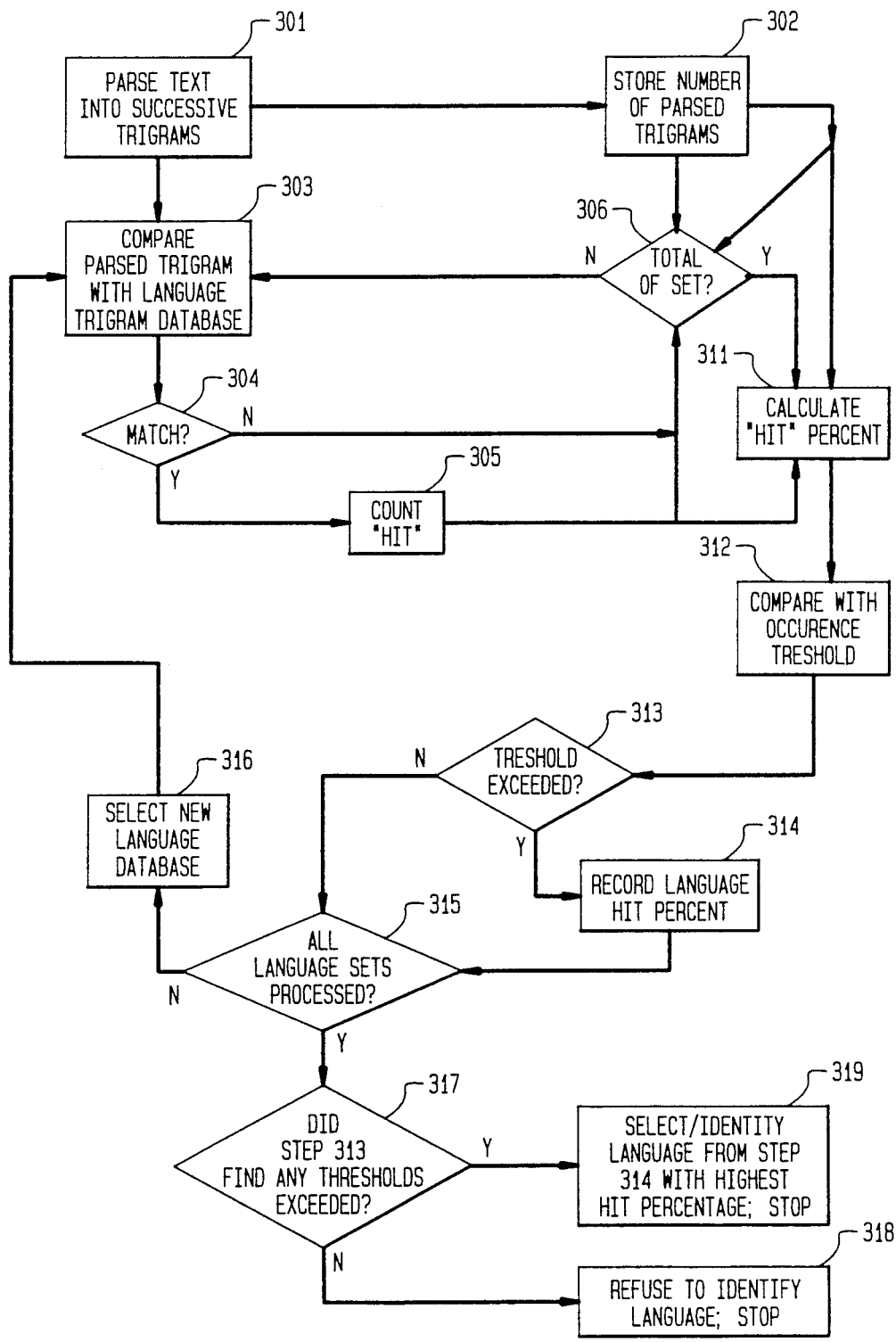
FIG. 3 is a general flow chart of the sequence of steps carried out in accordance with the text processing mechanism in accordance with the present invention.

More particularly, with reference to FIG. 2, there is shown a diagrammatic illustration of the parsing of an exemplary string of text: THIS SENTENCE IS WRITTEN IN ENGLISH. The string of this example contains 29 characters and 5 spaces for a total number N of 34 character/space locations that make up the string. Parsing the string into all of its possible sequentially occurring trigrams (identified at step 301 in the processing flow chart of FIG. 3) will produce a sequence of (N−2=) 32 trigrams, the number N being stored at step 302. The individual trigrams of the string of the present example are shown in FIG. 2 as trigrams THI, HIS, IS_, S_S, _SE, ... GLI, LIS, ISH.

In step 303, each of the trigrams (THI, HIS, IS_, etc.) that has been parsed from the body of text is compared with a set of trigrams that make up the identification data base of a particular language (e.g. English, French, German, Turkish, etc.). For each language there is unique key set of trigrams that have been predetermined to possess a prescribed frequency of occurrence. For example, the trigram _TH is one of the trigrams that is prevalent in English, while the trigram IE_is one of those that occurs frequently in German text. Thus, whether or not the body of text under investigation is written in that particular language can be determined by observing the percentage of time that a parsed trigram finds a match in the language-specific key set database.

Whenever a trigram that has been parsed form the body of text, e.g. HIS (the second trigram in the string of the example), has a counterpart in the stored database (e.g. English), a YES at step 304 signifies a match (YES) and causes step 305 to store an indication of the match (e.g. by the incrementing of a soft-counter). The process then proceeds to step 306 to determine whether all N−2 trigrams that have been parsed from the body of text have been processed. If not, the process proceeds to the next trigram in the sequence and the above steps are repeated.

When all N−2 trigrams have been compared with the contents of the language data base, the process proceeds to step 311 wherein the percentage of matches or 'hits' derived from steps 303, 304 is determined from the ratio of the total hits to the number N−2 of trigrams. Next, in step 312 the percentage of hits in step 311 is compared to a prescribed threshold value, associated with a selected minimum percentage of hits (e.g. 10%).

As noted briefly above, for most languages which employ a twenty six letter plus space alphabet, there are approximately 80 trigrams that satisfy a frequency of occurrence such that the set of approximately 80 trigrams accounts for approximately one-third of all the trigrams encountered in that language (i.e. the 'key set'). If the ratio of the number of hits in the examined body of text to its total number of parsed trigrams is at least equal to the threshold value, then the text is identified as being possibly written in the language associated with that respective key set (step 313). If the ratio is less than the threshold, then it is determined that the text is not written in that language. The process is repeated using each of the language databases until all the languages have been processed. After all languages have been processed, the language in the set of possible languages, recorded in step 314, with the highest 'hit' or 'match' percentage, is selected and identified as the language in which the text is written (step 319). If no language was identified as a possible language in step 313, then no language identification is made (step 318).

As pointed out earlier, the key set of (approximately 80) trigrams of each language database is different from that of other languages, even though there may be some degree of overlap (typically, eight or so), whereby a comparison of parsed trigrams with the database permits an accurate determination of the language in which the text is written. In to order determine which trigrams are to make up the database of a particular language, a reasonably sized section (e.g. 3,000–5,000 characters) of text is parsed into a plurality of trigrams, as in the example shown in FIG. 2. A running count is maintained of the occurrence of each of the trigrams that has been parsed from that section of text, and the ratio of each of the number of occurrences of the trigrams thus counted with the total number of trigrams into which the section of text has been parsed is calculated. From these ratios a characteristic is derived which is representative of the frequency of trigram occurrence of each trigram that may be formed using both the characters of that language and a space position. An examination of this ratio characteristic will reveal which trigrams occur at least some prescribed percentage of time (e.g. 30-35% for English) that is representative of a high likelihood of association with that language. As noted earlier, applying this process to languages which employ a twenty six letter alphabet (and taking into account a space location, for a total of twenty-seven characters) has revealed that, for a given language, out of the total possible number of trigram combinations (equal to $27^3$ or 19,683 trigrams), the number which occurs about one-third of the time, and therefore satisfies such a likelihood of association percentage, is fairly small (approximately 80 trigrams), so that the size of each language database is reasonable.

In practice, when setting the threshold value of step 312, based upon an examination of the ratio characteristic, some prescribed noise margin may be subtracted from the likelihood percentage used to assemble the trigram database for a respective language. Thus, for the current example of English text, the threshold might be set at 0.20, while for a German database, the value might be somewhat lower (e.g. on the order of 0.10-0.18).

As will be appreciated from the foregoing description, unlike the prior art mechanisms which classify language by examining selected characteristics of a speech signal waveform, the present invention parses a sample body of text and identifies its language by comparing successive trigrams into which that body of text is parsed with sets of trigrams that have been determined to be uniquely associated with respectively different languages. Advantageously, for a twenty six letter alphabet plus a space, there are only approximately 80 trigrams that satisfy such a selected probability, so that the size of each language database is practicable.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

APPENDIX A

```
10 CLS:KEY OFF:NL=9:DIM T$(NL,100),S(NL),N(NL)
20 FOR I=1 TO NL:READ N(I):FOR J=0 TO N(I):READ T$(I,J):NEXT J:NEXT I
30 PRINT:PRINT:PRINT:INPUT"INPUT A STRING: ",S$:PRINT:IF S$="" THEN STOP
40 FOR L=1 TO NL:S(L)=0:FOR J=1 TO N(L):I=1
50 IF INSTR(I,S$,T$(L,J))>0 THEN S(L)=S(L)+1:I=INSTR(I,S$,T$(L,J))+1:GOTO 50
60 NEXT J:S(L)=INT((S(L)*68/N(L))+.5):NEXT L
70 FOR I=1 TO NL:IF LEN(S$)/10<=S(I) THEN GOTO 80 ELSE NEXT I:GOTO 110
80 H=0:H1=0:FOR I=1 TO NL:IF S(I)>H THEN H=S(I):H1=I
90 NEXT I:FOR I=1 TO NL:IF I<>H1 THEN IF H=S(I) THEN GOTO 110
100 NEXT I:PRINT "THE LANGUAGE IS ";T$(H1,0):GOTO 120
110 PRINT "CANNOT DECIDE; NEED MORE DATA."
120 FOR I=1 TO NL:PRINT T$(I,0),S(I):NEXT I:GOTO 30
130 DATA 89,"ENGLISH","ABL","AL ","A C ","AN ","ARE","AS ","ATI","AT ","BE ","BLE ","CAN"
140 DATA "CE ","D T","ED ","ENT","ER ","ESS","ES ","EXP","E A","E F","E O"
150 DATA "E P","E S","E T","FOR","  T","GRA","G T","HAT","HE ","INE","ING"
160 DATA "IN ","ION","IST","IS ","  J ","ND ","NE ","NG ","NS ","NT ","N T","OF ","ONS","ON ","OR ","OUR","PRO"
170 DATA "RES","RE ","SE ","SS ","ST ","S A","S T","S W","THA","THE","THI"
180 DATA "TIO","TO ","TS ","T O","T T"," AN"," AR"," A "," BE"," CA"," CO"," DI"," EX"
190 DATA " FA"," FO"," IN"," IS"," MA"," OF"," ON"," PR"," RE"," SE"," TH"," TO"," WE"," WH"
200 DATA 81,"GERMAN","ACH","BEN","BER","CHE","CHR","CKT","CH ","DAS","DER","DIE","EDE"
210 DATA "EIB","EIN","EIS","EN ","EN ","ERS","ER ","ESE","ES ","EUT","E V","E W"
220 DATA "HEI","HE ","HRE","HT ","IBE","ICH","IND","IN ","IR ","IST","LE ","LLE","ND ","N A","N I","N S"
230 DATA "N U","REI","RST","R B","R C","R S","SCH","SER","SO ","SS ","STE"
240 DATA "ST ","TEN","TER","TE ","T D","UND","UTE","VER","WEI","WIR","ZU "
250 DATA " AL"," AU"," BE"," BI"," DA"," DE"," DI"," ES"," GE"," HE"," IC"," IS"," NI"," SC"
```

```
260 DATA " SO"," UN"," VO"," WE"," WI"," ZU"
270 DATA 75,"HEBREW","AKA","AKE","AL ","ANI","AN ","ARQ","AR ","ASH","ATZ","AT ","AVI","BEV","CHA"
280 DATA "EL ","ERE","ER ","ESH","ETA","ET ","EVA","EYF","FO ","HAL","HAM","HAN"
290 DATA "HAR","HA ","HIN","IM ","IN ","ISH","I L","KAS","KHA","KH ","LEH","LI "
300 DATA "L L","MIS","M B","M L","ON ","OTE","OTZ","OT ","ROT","R M","SHA","SHE"
310 DATA "SHI","SH ","TER","TUK","TZA","TZE","TZI","T H","UKH","VAK","YES","YFO"
320 DATA "YOT","ZE "," BE"," ET"," EY"," HA"," KA"," LE"," LI"," MA"," ME"," MI"," SH"," TA"
330 DATA " TU"," YE"," YO"," ZE"
340 DATA 68,"JAPANESE","AI ","AN ","ARI","ASH","ASU","ATA","A A","A D","A K","A N","A T","CHI","DES"
350 DATA "DE ","DOK","ESU","E I","E M","E N","GA ","HIK","HIT","HI ","ICH"
360 DATA "IKO","IHA","I M","I N","I W","KA ","KI ","KO ","KUR","KU ","MAS"
370 DATA "NI ","NO ","OKO","OKU","ONO","O D","O K","RE ","SHA","SHI","SUK","SU ","TE ","TO ","TSU","TTE"
380 DATA "UKA","UKI","URA","WA "," DE"," DO"," GA"," KA"," KI"," KO"," KU"," NA"," HA"," NO"
390 DATA " SH"," TA"," WA"
400 DATA 87,"HUNGARIAN","AGY","AK ","ALA","AN ","AR ","ATO","AT ","AZ ","A K","A N","A S"
410 DATA "BET","CIN","EGY","EK ","ELE","ELL","ELO","ELY","ENT","EN ","ESE"
420 DATA "ESZ","ES ","ETE","ETT","FEL","GOL","GYA","GY ","HAT","IMS","IS "
430 DATA "JEL","K A","K H","LEN","LET","LLE","LT ","LYA","LYE","L A","MEG"
440 DATA "MEL","NEK","NEV","NTE","N A","OLY","OL ","OTA","O E","SSZ","SZA"
450 DATA "SZE","SZO","S S","TAR","TES","TO ","TT ","T T","USC","YAN","YES"
460 DATA "ZOK","ZOT","ZO "," AL"," AN"," AZ"," A "," BE"," CI"," EG"," EL"
470 DATA " ES"," FO"," JE"," KE"," KI"," ME"," NE"," OL"," SZ"," VA"
480 DATA 63,"FRENCH","AIS","AI ","ANC","ANT","AUT","A Y","CE ","CON","DES"," ENT"
490 DATA "EN ","ER ","EST","ES ","ET ","E A","E D","E E","E L","E P","E Q"
500 DATA "E S","E T","FRA","IRE","IR ","IS ","JAI","JE ","LA ","LES","LE "
510 DATA "LLE","MEN","ME ","NE ",    ,"NT ","ONS","OUS","OUT","PAS","PRE"
520 DATA "QUE","RAI","RAN","REN","RES","RE ","SER","SE ","SSE","S A","S C"
530 DATA "S D","S L","TE ","TOU","TRE","T A","T D","UE ","UR ","US ","VOU"
540 DATA " AU"," AV"," A "," CE"," CO"," DE"," DO"," EN"," ET"," FR"," JE"
550 DATA " LA"," LE"," MA"," MO"," NO"," PA"," PL"," PR"," QU"," RE"," SE"
560 DATA " SU"," TR"," UN"," VI"," VO"
570 DATA 26,"TURKISH","ACA","ADA","AKI","ALA","ALT","ARA","ARI","AR ","ASI"," A N"
580 DATA "BAY","BIR","BU ","CEK","CIN","DA ","DE ","DIY","ECE","EDE","EGI"
590 DATA "EKL","EK ","ELE","EME","ERE","ERI","ER ","E G","E I","E V","E Y"
```

```
600 DATA "SID","SOR","ICI","IMI","IM ","INI","IN ","IR ","IST","IYO","IZ "
610 DATA "I B","I M","KAD","KAR","KIM","KLE","K I","LAR","LEC","LER","LE "
620 DATA "LI ","MEK","MIN","MI ","M B","NEK","NE ","NI ","OK ","ORA","ORU"
630 DATA "OR ","RAD","RA ","RI ","R B","SIN","STI","SUN","TIY","UN ","YOR"
640 DATA "Y K"," AL"," BA"," BI"," BU"," DA"," BE"," EI"," GO"," 6U"," IS"
650 DATA " K/"," KI"," NE"," OR"," SA"," SE"," SI"," VA"
660 DATA " I","SHALI","AKU","ALI","AMG","API","A C","A H","A K","A M","A N"," ,"A W"
670 DATA "A Y","BA ","CHA","DA ","EHA","EKO","EZA","GU ","HAL","HII","HI "
680 DATA "II ","IKA","IKI","ILI","I H","I K","I M","I N","I S","I U","I Y"
690 DATA "KA ","KI ","KO ","KEA","LA ","LI ","MA ","MBA","NA ","NGU","NI "
700 DATA "O M","PI ","RI ","SI ","TA ","TI ","UA ","UMB","UNA","URI","UAN"
710 DATA "HAP","WA ","YA ","ZA ","ZUR"," CH"," HI"," KA"," KI"," KU"," KW"
720 DATA " MA"," WA"," NI"," NY"," SA"," SI"," TA"," UN"," WA"," YA"," ZA"
730 DATA 67,"RUSSIAN","AK ","AT ","AYA","AZH","A O","A K","A V","BOO","CHI"," ,"E B"
740 DATA " V","HIN","HIT","INI","IH ","ITI","ITS","IT ","I M","I P","I S"
750 DATA "I A","LOO","NAY","NA ","NE ","NI ","NYE","OCH","ODS","OO ","OSH"
760 DATA "O T","OZH","PAZ","PRI","RAT","SA ","SCH","STA","TA ","TI ","SA"
770 DATA "T K","VAS","VI ","YA ","YES","YET","YE ","YOO","ZHI"," BI"," KA"
780 DATA " KO"," MN"," NA"," NI"," OO"," PA"," PE"," PR"," SH"," VA"," VI"
790 DATA " YI"
```

What is claimed:

1. A method of determining in what language a body of text is written comprising the steps of:
   (a) parsing said body of text into a plurality of trigrams so that at least some of the trigrams overlap adjacent words, each trigram comprising the contents of three successive character/space positions of said body of text;
   (b) comparing each of the trigrams that has been parsed from said body of text in step (a) with a plurality of trigram key sets, each respective trigram key set being associated with a respectively different language and containing those trigrams that have been predetermined to occur at a frequency that is at least equal to a prescribed frequency of occurrence of trigrams for that respective language; and
   (c) in response to the ratio of the number of trigrams of said body of text compared in step (b), that correspond to trigrams of a respective key set, to the total number of trigrams of said body of text being at least equal to a prescribed value and greater than such ratios for alternative languages, identifying the body of text as being written in the language associated with said respective key set.

2. A method according to claim 1, wherein the prescribed frequency of occurrence in step (b) is established in accordance with a measured probability of occurrence of every trigram capable of occurring in that language.

3. A method according to claim 1, wherein a respective one of the plurality of trigram key sets employed in step (b) is generated by the steps of:
   (i) parsing a section of text of a prescribed language into a plurality of trigrams, each of which is comprised of the contents of three successive character/space positions of said section of text;
   (ii) counting the number of occurrences of each of the trigrams that has been parsed from said section of text in step (i);
   (iii) determining the ratio of each of the number of occurrences of the trigrams counted in step (ii) with the total number of trigrams into which said section of text has been parsed in step (i), and deriving therefrom a characteristic representative of the frequency of trigram occurrence of each trigram that may be formed using the characters of said prescribed language and a space position;
   (iv) from the characteristic derived in step (iii), identifying the frequency of occurrence of trigrams for said prescribed language that is associated with a selected frequency of occurrence; and
   (v) generating, as said key set of trigrams, those triggers whose frequency of occurrence is at least equal to the frequency of occurrence identified in step (iv).

4. A method of determining in what language a body of text is written, said body of text containing N sequential character/space position, comprising the steps of:
   (a) parsing said body of text into each of (N−2) trigrams that are sequentially definable by said N sequential character/space positions so that at least some of the trigrams overlap adjacent words;
   (b) comparing each of the trigrams parsed in step (a) with a plurality of trigrams key sets, each respective trigram key set being associated with a respectively different language and containing those trigrams that have been predetermined to occur at a frequency that is at least equal to a prescribed frequency of occurrence of trigrams for that respective language; and (c) in response to the ratio of the number of trigrams of said body of text compared in step (b), that correspond to trigrams of a respective key set, to the total number of trigrams of said body of text, being at least equal to a prescribed value and exceeding such ratios for alterative languages, identifying the body of text as being written in the language associated with said respective set.

5. A method according to claim 4, wherein the prescribed frequency of occurrence in step (b) is established in accordance with a measured probability of occurrence of every trigram capable of occurring in that language.

6. A method of generating a key set of trigrams to be used in determining in what language text has been written, based upon a comparison of trigrams, into which said text is to be parsed, with said set of trigrams comprising the steps of:

(a) parsing a body of text of a prescribed language into a plurality of trigrams so that at least some of the trigrams overlap adjacent words, each trigram comprising the contents of three successive character/space positions of said body of text;

(b) counting the number of occurrences of each of the trigrams that has been parsed from said body of text in step (a);

(c) determining the ratio of each of the number of occurrence of the trigrams counted in step (b) with the total number of trigrams into which said body of text has been parsed in step (a), and deriving therefrom a characteristic representative of the frequency of trigram occurrence of each trigram that may be formed using the characters of said prescribed language and a space position;

(d) from the characteristic derived in step (c), identifying the frequency of occurrence of trigrams for said prescribed language that is associated with a selected frequency of occurrence; and (e) generating, as said key set of trigrams, those trigrams whose frequency of occurrence is at least equal to the frequency of occurrence identified in step (d).

* * * * *